(12) United States Patent
Shinada et al.

(10) Patent No.: US 8,832,227 B2
(45) Date of Patent: Sep. 9, 2014

(54) BASE STATION, WEB APPLICATION SERVER, SYSTEM, AND METHOD

(75) Inventors: Yuki Shinada, Kawasaki (JP); Kazunari Kobayashi, Kawasaki (JP); Daisuke Nitta, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 239 days.

(21) Appl. No.: 13/421,025

(22) Filed: Mar. 15, 2012

(65) Prior Publication Data

US 2012/0173670 A1 Jul. 5, 2012

Related U.S. Application Data

(63) Continuation of application No. PCT/JP2009/066282, filed on Sep. 17, 2009.

(51) Int. Cl.
| | |
|---|---|
| G06F 15/16 | (2006.01) |
| G06F 21/62 | (2013.01) |
| H04N 21/65 | (2011.01) |
| H04N 21/637 | (2011.01) |
| G06F 21/60 | (2013.01) |
| H04W 12/08 | (2009.01) |
| H04L 29/06 | (2006.01) |

(52) U.S. Cl.
CPC .............. *G06F 21/6218* (2013.01); *H04L 29/06* (2013.01); *H04N 21/65* (2013.01); *H04N 21/637* (2013.01); *G06F 21/604* (2013.01); *G06F 2221/2115* (2013.01); *G06F 2221/2119* (2013.01); *H04L 63/104* (2013.01); *H04W 12/08* (2013.01)
USPC .......................................................... 709/217

(58) Field of Classification Search
CPC ....... H04M 1/72; H04N 21/27; H04N 21/437; H04N 21/60; H04N 21/637; H04N 21/65; H04L 29/06; G06F 2112/163
USPC .......................................................... 709/217
See application file for complete search history.

(56) References Cited

U.S. PATENT DOCUMENTS 8,041,350 B2 * 10/2011 Inagaki et al. ............. 455/422.1
2007/0061488 A1 * 3/2007 Alagappan et al. ........... 709/246

(Continued)

FOREIGN PATENT DOCUMENTS

| JP | 2001-057534 | 12/2001 |
|---|---|---|
| JP | 2003-150434 | 5/2003 |

(Continued)

OTHER PUBLICATIONS

International Search Report issued for corresponding International Patent Application No. PCT/JP2009/066282, mailed Dec. 22, 2009.

*Primary Examiner* — Krisna Lim
(74) *Attorney, Agent, or Firm* — Myers Wolin, LLC

(57) ABSTRACT

A base station accommodating a user terminal may include a user data management database configured to store user data, a security managing part configured to manage groups to which the user data are open, and a user data managing part configured to manage the user data. When the user data managing part receives a request to send user data from a Web application server and a group, included in the request and to which the requested user data are open, is included within the groups managed by the security managing part, the user data managing part may send the requested user data to the Web application server.

10 Claims, 15 Drawing Sheets

(56) References Cited

U.S. PATENT DOCUMENTS

| | | | |
|---|---|---|---|
| 2007/0230679 A1* | 10/2007 | Altberg et al. | 379/218.01 |
| 2008/0114834 A1 | 5/2008 | Miyazaki | |
| 2008/0233957 A1 | 9/2008 | Akama | |
| 2009/0221307 A1* | 9/2009 | Wolak et al. | 455/466 |
| 2009/0323680 A1* | 12/2009 | Kubler et al. | 370/352 |
| 2010/0325714 A1* | 12/2010 | Iyer et al. | 726/8 |

FOREIGN PATENT DOCUMENTS

| | | |
|---|---|---|
| JP | 2005-057706 | 3/2005 |
| JP | 2007-266785 | 10/2007 |
| JP | 2008-123233 | 5/2008 |
| JP | 2008-125114 | 5/2008 |
| JP | 2008-234093 | 10/2008 |
| JP | 2009-169913 | 7/2009 |
| JP | 2009-207106 | 9/2009 |

* cited by examiner

FIG.8

| OWN ADDRESS | aaa.bbb.ccc.ddd |
|---|---|

811 — 810

| SERVICE NAME | WEB APPLICATION SERVER ADDRESS |
|---|---|
| xxx | aaa.bbb.ccc.xxx |
| yyy | aaa.bbb.ccc.yyy |
| zzz | aaa.bbb.ccc.zzz |

| FILE NAME | USER IDENTIFIER | FILE TYPE | KEYWORD | ACCESS PERMITTED GROUP |
|---|---|---|---|---|
| aaa | A | DIARY | NAME | 1 |
| bbb | A | DIARY | NAME OF PET | 2 |
| ccc | B | DIARY | NAME OF ARTIST | 3 |
| ddd | A | PICTURE | OWN PICTURE | 1/2 |
| eee | A | PICTURE | PICTURE OF PET | NO RESTRICTION |
| fff | B | PICTURE | PICTURE OF ARTIST | 3 |
| ggg | A | VIDEO | VIDEO OF PET | 2 |
| hhh | B | VIDEO | VIDEO OF ARTIST | 3 |

FIG.10

| ROW NUMBER | SERVICE NAME | USER IDENTIFIER | GROUP |
|---|---|---|---|
| 1 | xxx | A | 1/2/3 |
| 2 | xxx | B | 1/3 |
| 3 | xxx | C | 4/5 |
| 4 | yyy | A | 1/2/3/4/5 |
| 5 | yyy | B | 1/3/5 |

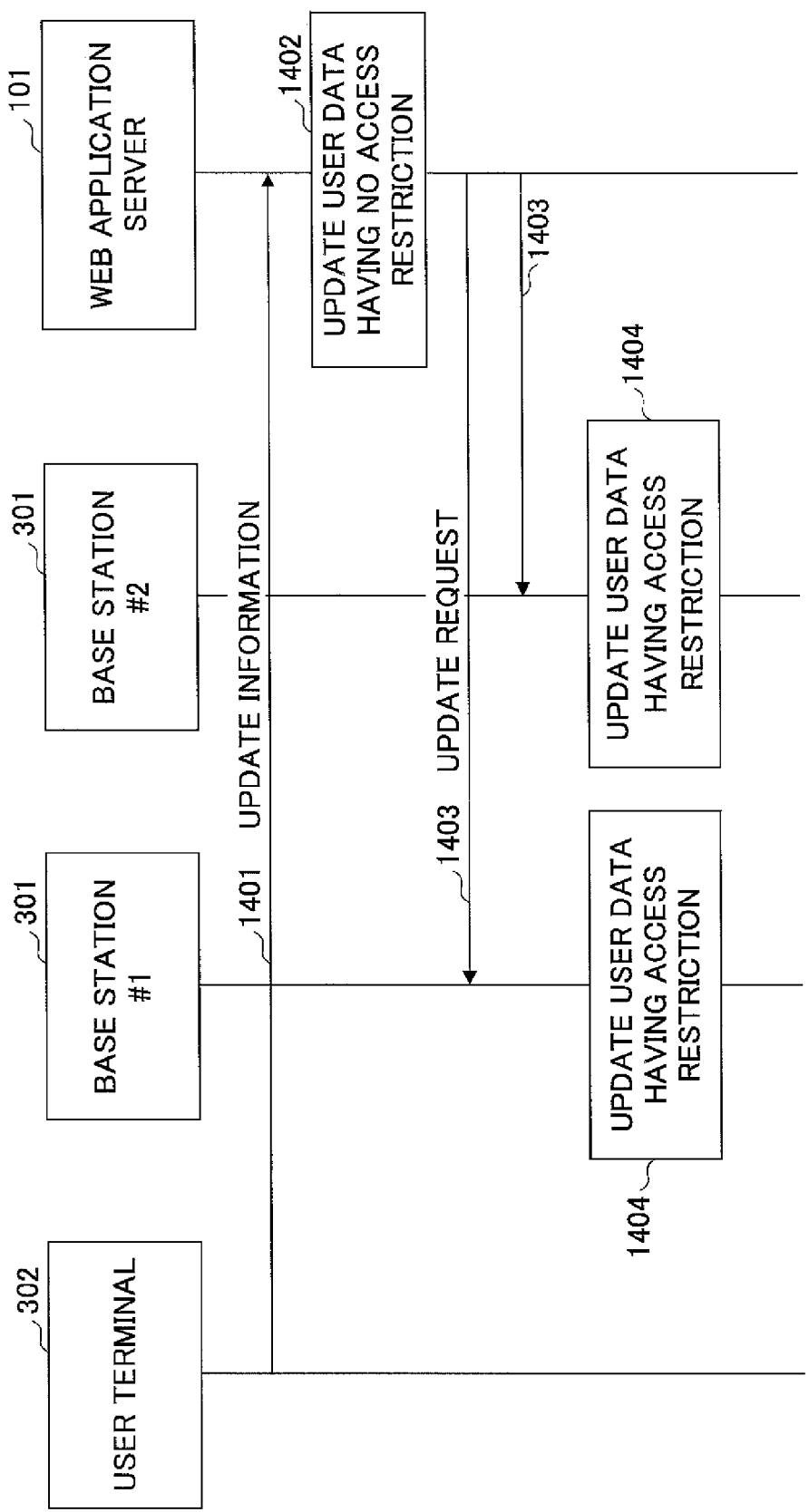

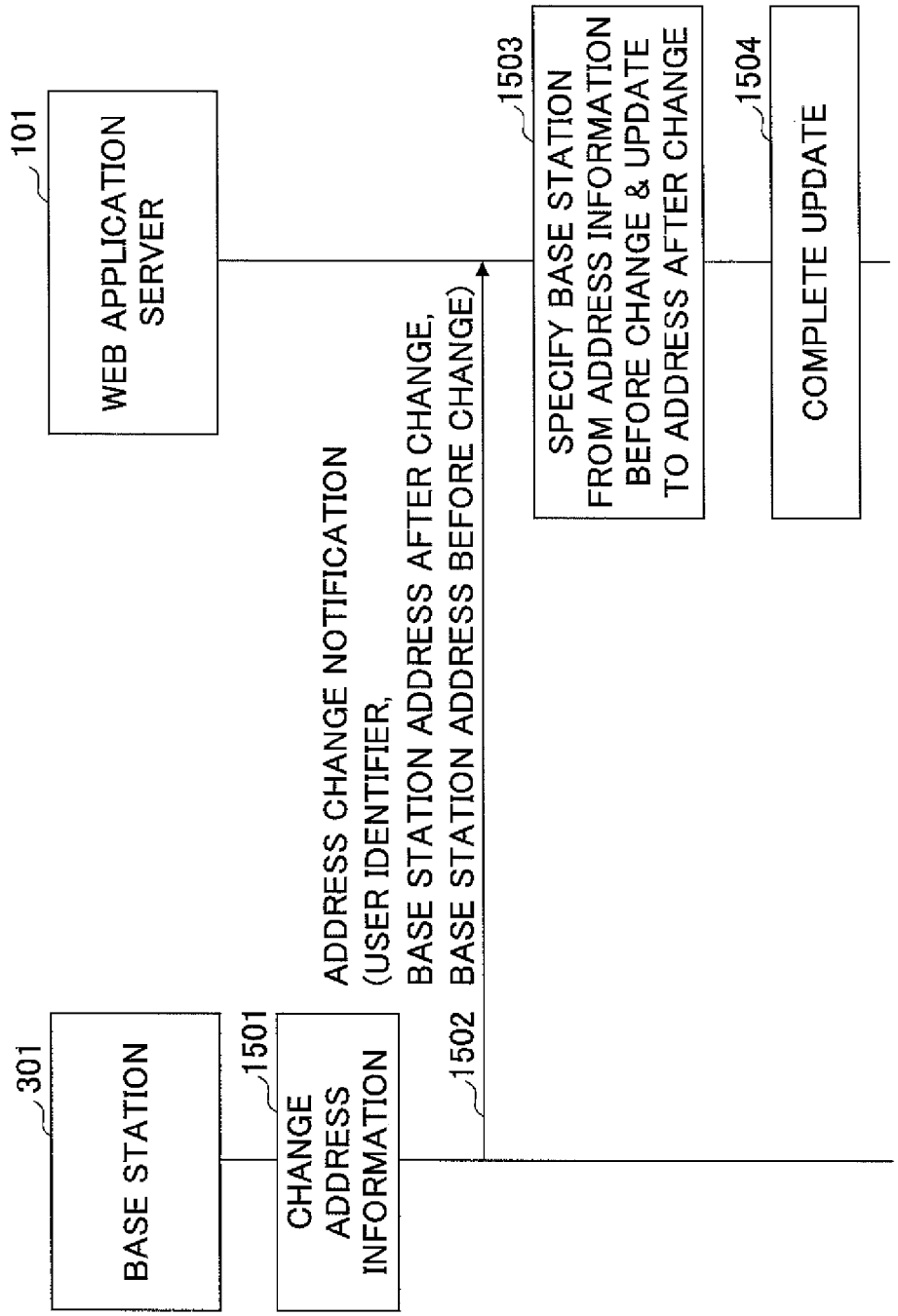

BASE STATION, WEB APPLICATION SERVER, SYSTEM, AND METHOD

CROSS-REFERENCE TO RELATED APPLICATIONS

This application is a continuation application filed under 35 U.S.C. 111(a) claiming the benefit under 35 U.S.C. 120 and 365(c) of a PCT International Application No. PCT/JP2009/066282 filed on Sep. 17, 2009, the entire contents of which are incorporated herein by reference.

FIELD

The disclosure relates to a base station, a Web application server, a system, and a method.

BACKGROUND

Services of a cellular phone may include Web application services, such as a social networking service and the like. Recently, due to diversification of such services, the amount of information and/or the number of users have/has increased, to thereby make the management of the information complex.

An example of a system structure of a conventional Web application service will be described with reference to FIG. 1. A conventional system 1 includes a Web application service operator 100, an IP network 200, and one or a plurality of homes 300 connected to a Web application server 101 via the IP network 200. The home 300 may be a small-scale office, a shop, or the like. A femtocell access point (base station) 301 that forms a femtocell having a small cell radius with respect to a macrocell is set up at the home 300. Because the base station 301 provides simultaneous communications with user terminals 302 of a plurality of users 303 within a range on the order of a several tens of meters in radius, the base station 301 is generally used as a countermeasure with respect to a skip zone of the cellular phone service.

The Web application server 101 provided with a large-capacity database 102 is set up at the Web application service operator 100 for the purpose of aggregation and/or management of the extremely large amount of information. Conventionally, when the amount of information and/or the number of users suddenly increase/increases, the server performance is improved and/or the server is added at all times. However, the improvement of the server performance alone may not be able to cope with the increased amount of information, and the addition of the server may be a problem from the point of view of the cost or the available setup space.

In addition, the Web application handles personally identifiable information in many cases, but the operator 100 conventionally manages the personally identifiable information. With respect to security measures, the data are subjected to an encryption according to an encryption technique or the like at the operator 100 in order to enhance the security, however, the possibility of a leak cannot be eliminated completely. The leak of the personally identifiable information may cause an extremely large damage to the user or the operator 100.

SUMMARY

Accordingly, it is an object in one aspect of the embodiment to provide a base station, a Web application server, a system, and a method that manage information and/or security.

One aspect of the embodiment may provide a base station accommodating a user terminal and connectable to a Web application server, including a user data management database configured to store user data; a security managing part configured to manage groups to which the user data are open; and a user data managing part configured to manage the user data, wherein, when the user data managing part receives a request to send user data from the Web application server and a group, included in the request and to which the requested user data are open, is included within the groups managed by the security managing part, the user data managing part sends the requested user data to the Web application server.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 8 is a diagram illustrating an example of tables retained by an address management database of the embodiment;

FIG. 9 is a diagram illustrating an example of a table retained by a security management database of the embodiment;

FIG. 10 is a diagram illustrating an example of a table retained by a user data management database of the embodiment;

FIG. 14 is a flow chart illustrating a user data updating process of the base station of the embodiment; and FIG. 15 is a flow chart illustrating a base station address updating process of the embodiment.

DESCRIPTION OF EMBODIMENTS

Preferred embodiments of the present invention will be described with reference to the accompanying drawings.

<System Structure>

Figure 1:
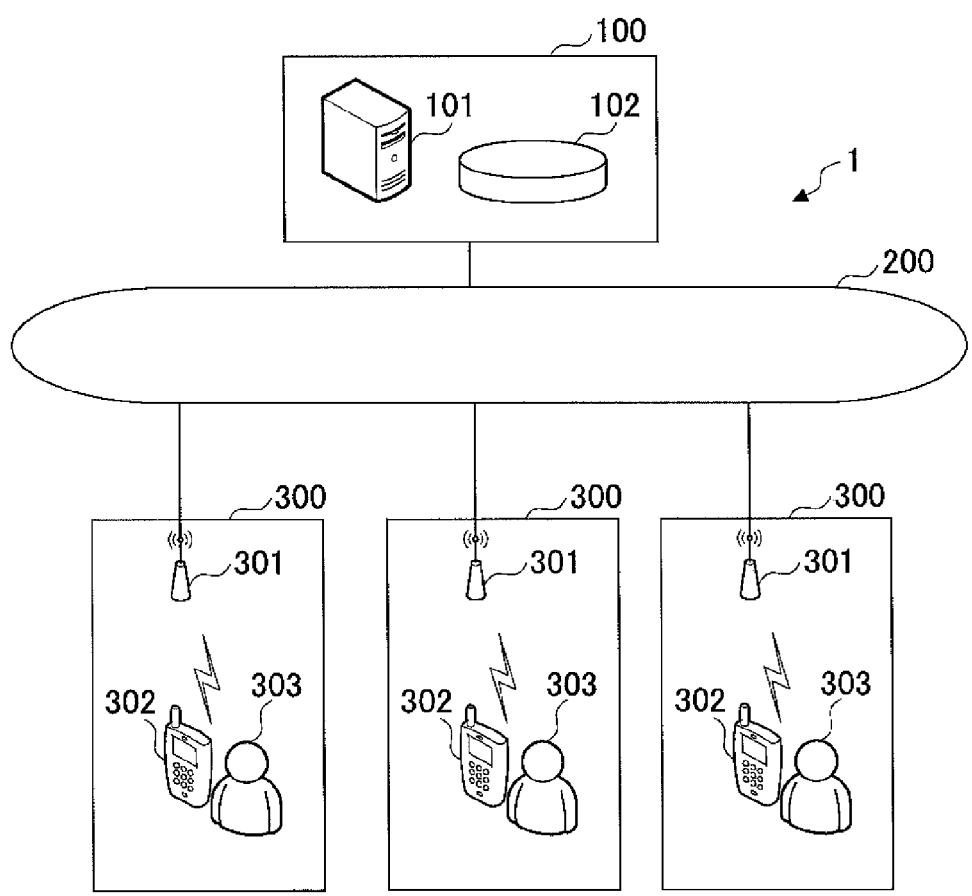
FIG. 1 is a diagram illustrating an example of a system structure of a conventional Web application service.

A description will be given of an example of a system structure of a Web application service of an embodiment, by referring to FIG. 2. A system 2 of the embodiment illustrated in FIG. 2 differs from the system illustrated in FIG. 1 in that only a part of user data is managed in a database 102 of a Web application server 101, and a femtocell access point (base station) 301 is provided with a database 304.

Figure 2:
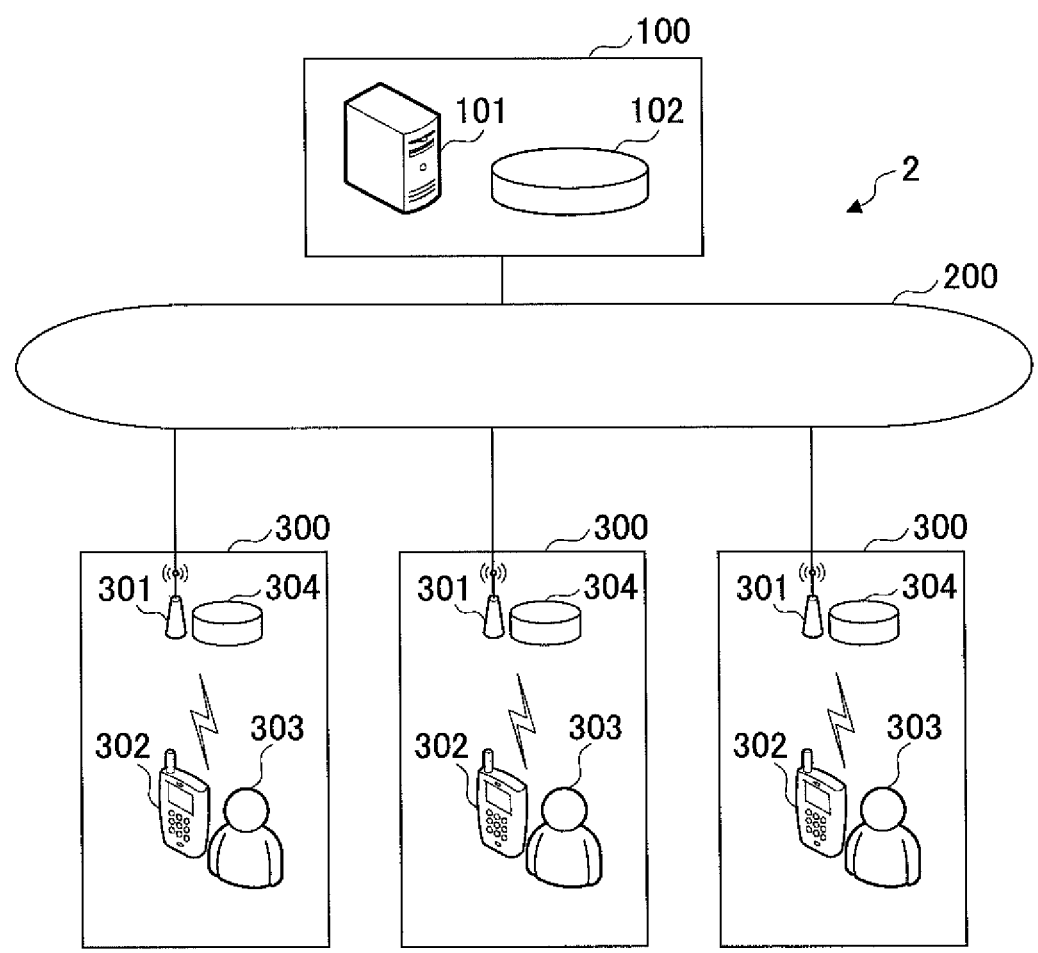
FIG. 2 is a diagram illustrating an example of a system structure of a Web application service of an embodiment.

In the embodiment, as illustrated in FIG. 2, data of each user are managed in both the Web application server 101 and the base station 301. The user data are classified into data (hereinafter referred to as user data having no access restriction) open to the general public, and data (hereinafter referred to as user data having access restriction) that may only be open within a group to which the user belongs. The user data having no access restriction are managed in the Web application server 101, and the user data having access restriction are managed in the base station 301, in order to improve the performance of the Web application server 101 and suppress the need to provide an additional server even when the amount of information increases.

<System Operation>

Figure 3:
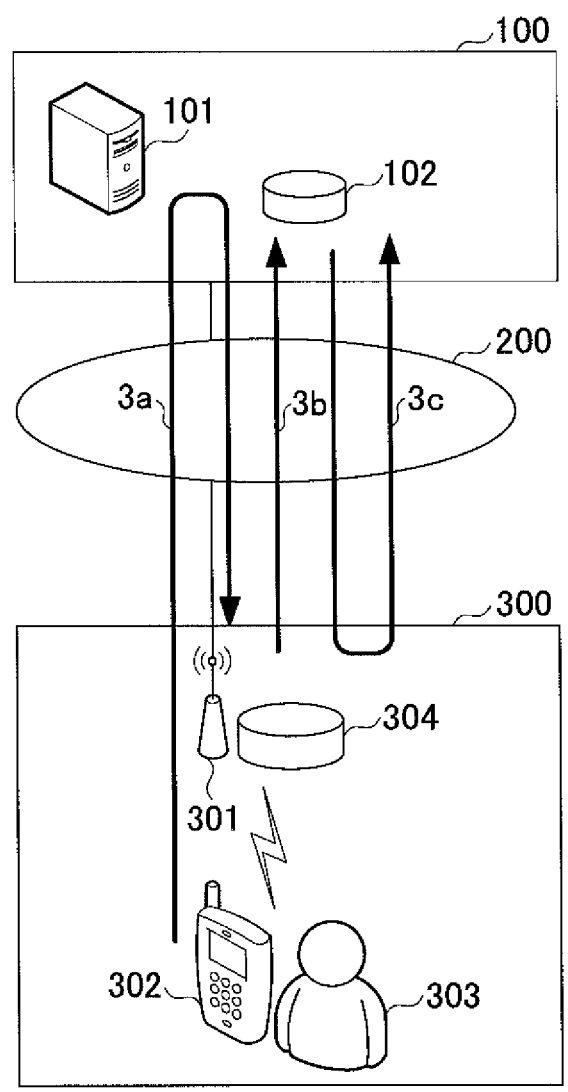
FIG. 3 is a diagram illustrating an example of a system operation of the Web application service of the embodiment.

A description will be given of an example of a system operation of the Web application service of the embodiment, by referring to FIG. 3. FIG. 3 uses the same system structure as that illustrated in FIG. 2.

When a user 303 registers to a we application service provided by the Web application server 101 in a step 3a, the Web application server 101 sends registered data to the base station 301. The registered data includes a security setting of the user data.

The base station 301 classifies the user data in a step 3b, based on the security setting received in the step 3a. For example, a user group to which the user data may be open is considered as the security setting. The base station 301 sends to the Web application server 101 the user data that is set to be open to all groups (users), that is, the user data having no access restriction. In this case, the user data are managed in the Web application server 101 in order to be always accessible without restriction by all users. In addition, the base station 301 manages the user data that are accessible only by the users belonging to a specific group, that is, the user data having access restriction.

Accordingly, because the user data accessible only by the users belonging to the specific group include personally identifiable information in many cases, the security may be improved by managing the user data having access restriction in each of the base stations 301. In addition, by managing a part of the user data conventionally managed by the Web application server 101 in each of the base stations 301, a storage capacity to be provided in the Web application server 101 may be reduced.

When the Web application server 101 receives an access request for the user data from another base station 301 that is not illustrated in FIG. 3, the Web application server 101 requests the base station 301 managing the requested user data to send the user data, in a step 3c. The base station 301 that receives the request judges whether it is possible to send the requested user data to the Web application server 101, based on the security setting acquired in the step 3a, and sends the user data only when it is judged possible.

The Web application server 101 deletes the received user data having access restriction after a predetermined time elapses. Hence, the security of the user data having access restriction is maintained. Next, a description will be given of how the user data having access restriction are transmitted and received between the Web application server 101 and the base station 301, by referring to FIG. 4.

Figure 4:
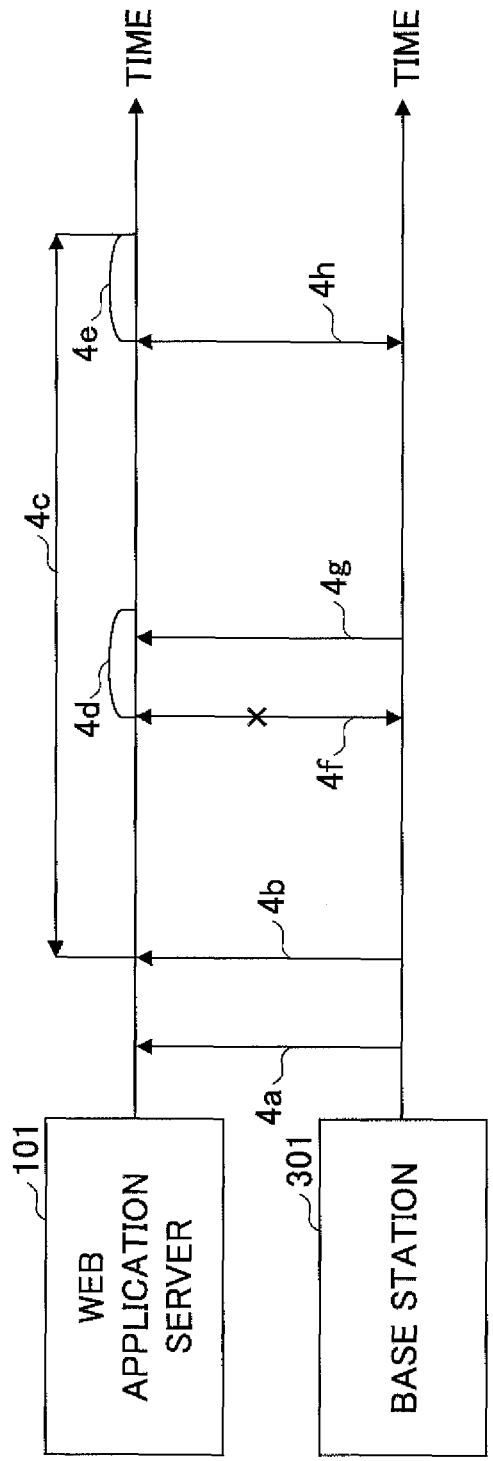
FIG. 4 is a diagram for explaining transmission and reception of user data in the embodiment.

FIG. 4 is a diagram for explaining the transmission and reception of the user data in the embodiment. The Web application 101 receives the access request for the user data from the user 303 via the base station 301, in a step 4a.

The Web application server 101 acquires the user data open to the group to which the user 303 belongs, from the base station 301 managing the user data, in a step 4b.

The Web application server 101 temporarily stores the acquired user data in a step 4c. The Web application server 101 retains the user data having access restriction for a predetermined time even after the interruption of service (or end of service), as indicated by times 4d and 4e. Hence, even when an unexpected disconnection of the connection or the like occurs due to the wireless quality in a step 4f, the service may continue to be provided in a step 4g without resending the request to send the user data having access restriction.

In addition, the Web application server 101 may improve the user convenience of the service by extending the time 4d in which the user data having access restriction and frequently accessed are retained after the service is interrupted in the step 4f, and extending the time 4h in which the user data having access restriction and frequently accessed are retained after the service is ended in the step 4h.

<Structure of Web Application Server>

Figure 5:
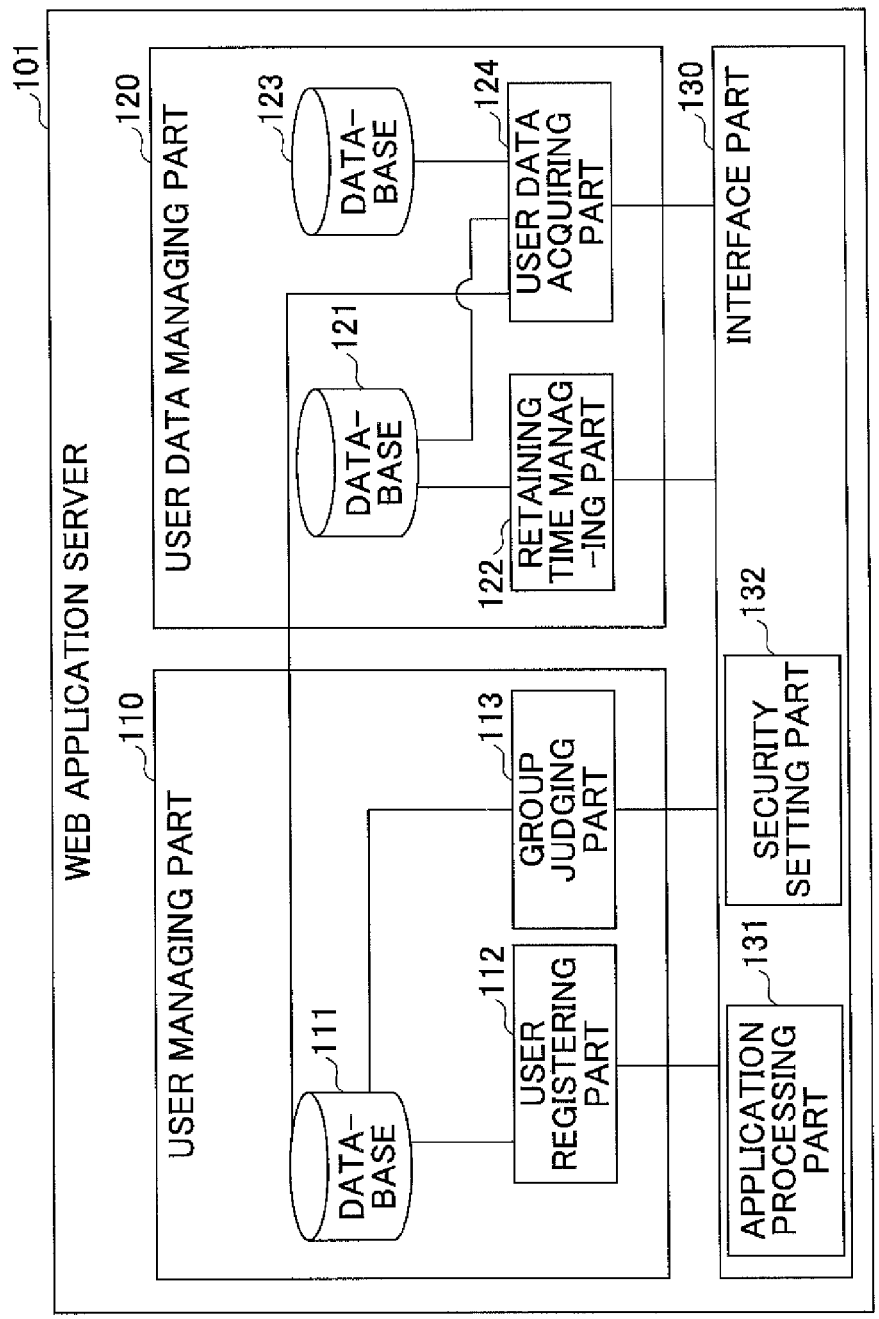
FIG. 5 is a diagram illustrating a structure of a Web application server of the embodiment.

A description will be given of a structure of the Web application server of the embodiment, by referring to FIG. 5. As illustrated in FIG. 5, the Web application server 101 includes a user managing part 110, a user data managing part 120, and an interface part 130. The user managing part 110 may be formed by a processor, such as a CPU (Central Processing Unit), and a storage unit. Similarly, the user data managing part 120 may be formed by a processor, such as a CPU, and a storage unit. In addition, the user managing part 110 and the user data managing part 120 may be formed by a single processor, such as a CPU, and a storage unit. The storage unit may store a program for causing the processor to function as one of the user managing part 110 and the user data managing part 120. The storage unit may also form a database.

The user managing part 110 manages information of the user 303 required to provide the Web application service. The user managing part 110 may be provided inside the Web application server 101 as illustrated in FIG. 5 or, may be set up outside the Web application server 101.

The user managing part 110 manages the user information of the user 303 utilizing the service. The user information includes information of the base station 301 accommodating the user 303, information of the group to which the user 303 belongs, and the like. The Web application server 101 may recognize by the user managing part 110 the base station 301 that manages the data required in order for the user 303 to receive the service.

The user data managing part 120 manages the two kinds of user data according to mutually different methods. The user data having no access restriction are constantly retained within the user data managing part 120. Hence, the we application server 101 may provide the user data having no access restriction to the user terminal 303 at any time without having to acquire the user data having no access restriction from the base station 301.

The user data having access restriction, that may be open only within the specific group, are basically retained in each base station 301. The Web application server 101 may acquire by the user data managing part 120 the data required to provide the service to the user 303 from each base station 301, and temporarily retain the data within the Web application server 101, in order to provide the service.

When the Web application server 101 ends the service, the temporarily retained user data having access restriction, that may be open only within the specific group, are deleted from the user data managing part 120.

The interface part 130 provides a user interface that is required in order to provide the Web application service. In addition, the interface part 130 supports the user 303 when setting the security setting of the user data via the user terminal 302 and the base station 301.

Next, a more detailed description will be given of the structure of the Web application server 101, by referring to FIG. 5.

<User Managing Part>

The user managing part 110 includes a user management database 111, a user registering part 112, and a group judging part 113.

The user management database 111 manages information initially registered by the user 303 in order to utilize the Web application, such as an identifier of the user 303, the group to which the user 303 belongs, and the address of the base station 301 accommodating the user 303.

In addition, by managing such registered information for each user 303, it becomes possible to provide the service to a plurality of users 303 via a single base station 301.

The user registering part 112 sends to the user management database 111 the information initially registered by the user 303 in order to utilize the Web application. Further, when the registered information is updated, new information received from the base station 301 is sent to the user management database 111. For example, the group is sent to the user management database 111 when the group to which the user 303 belongs changes, and the address of the base station 301 is set to the user management database 111 when the address of the base station 301 changes.

Figure 6:
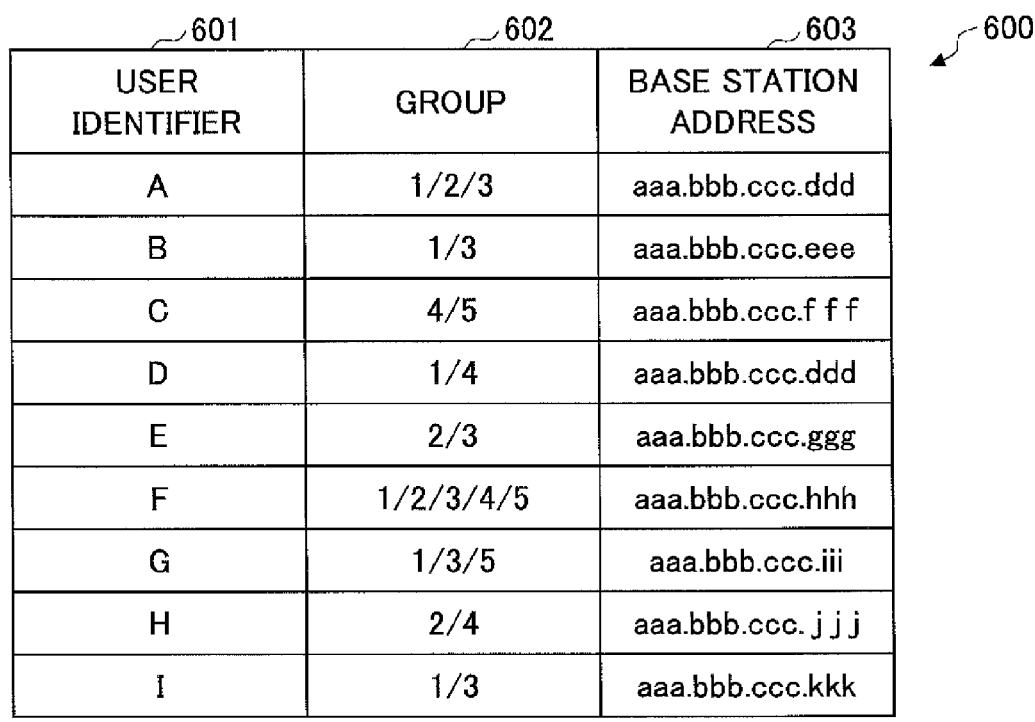
FIG. 6 is a diagram illustrating an example of a table retained by a user management database of the embodiment.

FIG. 6 illustrates an example of a table retained by the user management database. A user management table 600 includes an identifier 601 of the user 303, a group 602 to which the user 303 belongs, and a base station address 603 of the base station 301 accommodating the user 303. For example, the user having an identifier A belongs to three groups 1, 2, and 3, and is accommodated by the base station 301 having an IP address "aaa.bbb.ccc.ddd". In addition, because the information is managed for each identifier 601 of the user 303, a plurality of users 303 may be managed via a single base station 301. In the example illustrated in FIG. 6, two users, namely, the user having the identifier A and the user having an identifier D are managed via the same base station 301 having the address "aaa.bbb.ccc.ddd".

The group judging part 113 judges the group to which the user 303 belongs, based on the identifier of the user 303 included in the access request for the user data from the user terminal 302, and the user management table 600 (FIG. 6) retained by the user management database 111. For example, in a case in which the group judging part 113 receives the access request including the identifier A from the user terminal 302, the group judging part 113 judges from the user management table 600 that the user 303 belongs to the groups 1, 2, and 3. Hence, with respect to the access request for the user data from the user 303, the Web application server 101 may provide the user data of the group to which the user belongs.

<User Data Managing Part>

The user data managing part 120 includes a database 121 to manage the user data having access restriction, a retaining time managing part 122, a database 123 to manage the user data having on access restriction, and user data acquiring part 124. The two user data management databases 121 and 123 may be formed as a single database.

The user data management database 121 to manage the user data having access restriction acquires from the base station 301 the user data permitted to be shared only by the users 303 belonging to the specific group, and temporarily manages the acquired user data. The user data management database 121 to manage the user data having access restriction deletes the user data having access restriction after a predetermined time elapses, in accordance with an instruction from the retaining time managing part 122.

The retaining time managing part 122 manages the time for which the user data having access restriction are to be retained in the user data management database 121. The retaining time managing part 122 instructs deletion of the user data having access restriction with respect to the user data management database 121 after the predetermined time elapses from the time when the service is interrupted or ended. Alternatively, the retaining time managing part 122 may instruct a time limit by which the user data having access restriction is to be deleted. In addition, with respect to the user data that are frequently accessed, the predetermined time or time limit in order to suppress the amount of data communicated between the Web application server 101 and the base station 301.

The user data management database 123 to manage the user data having no access restriction manages the user data that are permitted to be shared by arbitrary user according to the security setting. For example, the user data management database 123 manages the user data to which the access is permitted for all groups or all users or, the user data to which the access is permitted for a number of groups greater than a predetermined number, such as 5, 10, or the like. Because the Web application server 101 only needs to constantly manage such user data having the low security level, the Web application server 101 may provide the service using a small memory capacity.

The user data acquiring part 124 requests and acquires from each base station 301 the user data accessible from the user 303 utilizing the service. The user data acquiring part 124 judges whether the acquired user data have the access restriction, and stores the user data having access restriction into the user data management database 121, and stores the user data having no access restriction into the user data management database 123.

When the user data are updated, the user data acquiring part 124 updates the user data in the user data management databases 121 and 123, and requests updating of the original data retained in each base station 301 after the service is ended.

<Interface Part>

The interface part 130 includes an application processing part 131 and a security setting part 132.

The application processing part 131 provides a user interface and the like required to provide the Web application service. For example, the application processing part 131 provides the interface in order to enable the user 303 to make a user registration to the Web application server and to make an operation such as access, edit, create, retain, delete, and the like on the user data.

The security setting part 132 provides an interface in order to enable the user 303 to set the security setting of the user data via the user terminal 302 and the base station 301. The security setting part 132 may notify the security setting set by the user 303 to each base station 301.

When the user 303 retains the user data by the support provided by the application processing part 131 and sets the security setting to the user data by the support provided by the security setting part 132, the user data acquiring part 124 determines the storage location of the user data depending on the security setting.

The user data acquiring part 124 judges that the user data having the security setting lower than a predetermined security level as the user data having no access restriction, and stores the user data having no access restriction in the user data management database 123. The predetermined security level may indicate the number of groups to which the user data may be open, whether the user data may be open to all groups, and the like.

On the other hand, the user data acquiring part 124 judges that the user data having the security setting that is the predetermined security level or higher as the user data having access restriction, and sends the user data having access restriction to the base station 301.

Alternatively, the storage location of the user data may be determined by a user data managing part 340 of the base station 301. In this case, the application processing part 131 of the Web application server 101 sends all user data received from the user terminal 302 to the base station 301.

<Structure of Base Station>

Figure 7:
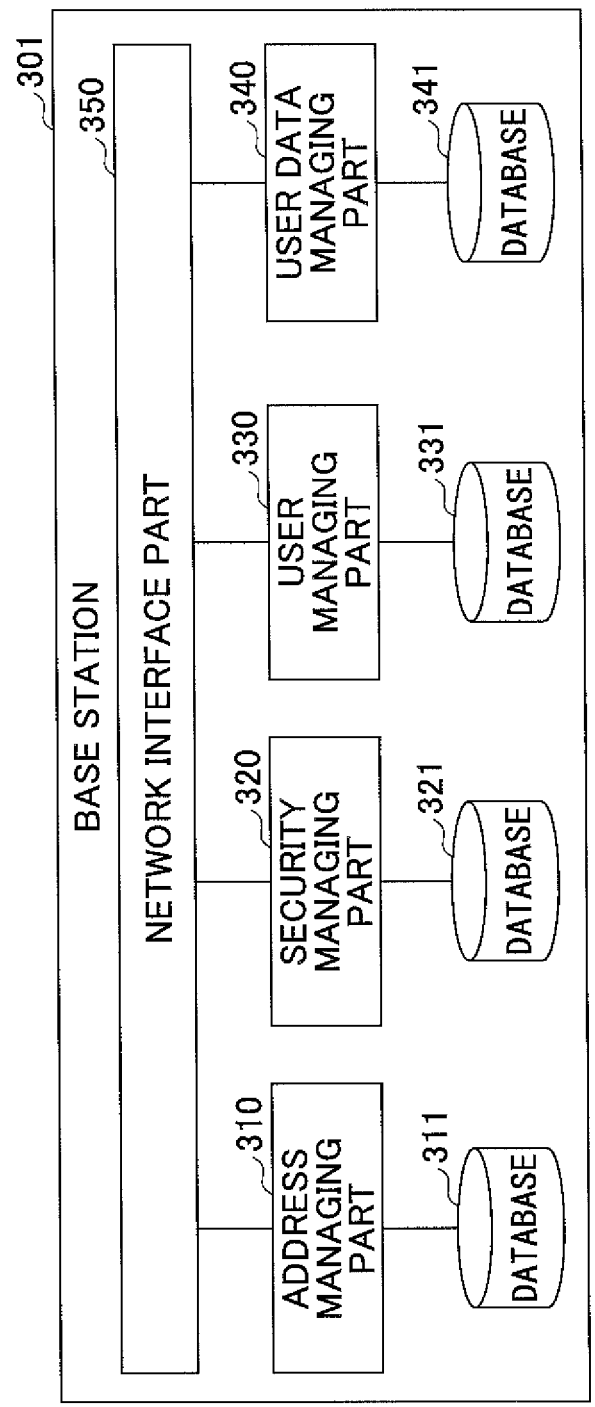
FIG. 7 is a diagram illustrating a structure of a base station of the embodiment.

A description will be given of a structure of the base station of the embodiment, by referring to FIG. 7. As illustrated in FIG. 7, the base station includes an address managing part 310, a security managing part 320, a user managing part 330, a user data managing part 340, and a network interface part 350. The base station further includes four databases with for the respective managing parts, namely, an address management database 311, a security management database 321, a user management database 331, and a user data management database 341. The four databases 311, 321, 331, and 341 may be formed as a single database.

Each of the address managing part 310, the security managing part 320, the user managing part 330, and the user data managing part 340 may be formed by a processor, such as a CPU, and a storage unit. Further, a single processor, such as a CPU, and a storage unit may form at least two of the address managing part 310, the security managing part 320, the user managing part 330, and the user data managing part 340. The storage unit may store a program for causing the processor to function as one of the address managing part 310, the security managing part 320, the user managing part 330, and the user data managing part 340. The storage unit may also form a database.

The address managing part 310 manages the address of the base station 301 itself, and the address of the Web application server 101. These addresses are stored in the address management database 311, and are automatically updated when the addresses are changed.

A description will be given of an example of tables retained by the address management database of the embodiment, by referring to FIG. 8. The address management database 311 includes a base station address table 810, and a Web application server address table 820.

The base station address table 810 stores an address 811 of the base station 301 itself. In the example illustrated in FIG. 8, the address of the base station 301 stored in the base station table 810 is "aaa.bbb.ccc.ddd".

The Web application server address table 820 stores an address 822 of the Web application server that provides the service, for each service name 821 indicating the name of the Web application service. In the example illustrated in FIG. 8, three Web application services are provided by mutually different Web application servers.

The security managing part 320 (FIG. 7) acquires and manages the security setting set by the user 303 via the security setting part 131 of the Web application server 101. The security managing part 320 judges whether the user data are the user data having no access restriction or, the user data having access restriction and open only within the specific group, based on the security setting.

A description will be given of an example of a table retaining the security management database of the embodiment, by referring to FIG. 9. The security management database 321 includes a security management table 900. The security management table 900 stores a file name 901 of a file of the user data, an identifier 902 of the user who is the owner of the file, a file type 903, a keyword 904 set to the file, and a permitted group 905 permitted to make access to the file. The keyword 904 may be formed by a character string whose input is requested when the user 303 wishes to make access to the file.

In the example illustrated in FIG. 9, the file having the file name "aaa" is owned by the user having the identifier A, and the file type of this file is a diary. A name is set as the keyword of this file. The keyword 904 may actually be "hanako" or the like, that is a real or virtual name set by the user 303. Only the group 1 is permitted to make access to this file. In addition, the plurality of groups 1 and 2 are permitted to make access to the file having the file name "ddd". All groups are permitted to make access to the file having the file name "eee" because there is no access restriction on this file.

In the example illustrated in FIG. 9, the security setting is set for each file, however, the security setting may be set for each file type 903 or for each identifier 902 of the user, in order to judge the permitted group 905 permitted to make access to the file. For example, the security setting may be set so that only the group 1 is permitted to make access to the file of the diary owned by the user having the identifier A. In this case, a column for the file name 901 may be omitted.

The user managing part 330 (FIG. 7) is accommodated by the base station 301, and manages information of each user 303 utilizing the Web application service. When the user managing part 330 receives the request to send the user data from the Web application server 101, the user managing part 330 judges whether the user who is managed thereby belongs to the group included in the received request. This judgement may be made using a table (FIG. 10) retained by the user management database 331 which will be described later. In a case in which the user managed by the user managing part 330 belongs to the group included in the received request, the user managing part 330 sends the requested user data to the Web application server 101.

A description will be given of an example of the table retained by the user management database of the embodiment, by referring to FIG. 10. The user management database 331 includes a user management table 1000. The user management table 1000 stores a service name 1001, a user identifier 1002, and a group 1003 to which the user belongs. The service name 1001 corresponds to the service name 821 illustrated in FIG. 8. The user identifier 1002 corresponds to the user identifier 601 illustrated in FIG. 6 and the user identifier 902 illustrated in FIG. 9. Further, the group 1003 corresponds to the group 602 illustrated in FIG. 6.

In the example illustrated in FIG. 10, the group to which the user 303 belongs is indicated for each Web application service identified by the service name. Row numbers 1, 2, and 3 indicate the groups to which the users having the identifiers A, B, and C belong when providing the Web application service having the service name "xxx". Row numbers 4 and 5 indicate the groups to which the users having the identifiers A and B belong when providing the Web application service having the service name "yyy".

The user data managing part 340 sends the user data having no access restriction to the Web application server 101 according to the security setting, and retains in the base station 301 the user data having access restriction and sharable only within the specific group. When sending the user data retained in the user data management database 341 to the Web application server 101 while the user 303 is utilizing the Web application service, the user data are sent according to the judgement made by the user managing part 330.

When the Web application server 101 determines the storage location of the user data, the user data managing part 340 retains in the user data management database 341 all user data received from the Web application server 101.

Alternatively, when the base station 301 determines the storage location of the user data, the user data managing part 340 may determine the storage location of the user data based on the security management table 900 when the user data are received from the Web application server 101.

The user data managing part 340 judges that the user data having the security setting lower than the predetermined security level as the user data having no access restriction, and sends the user data having no access restriction to the Web application server 101. The predetermined security level may indicate the number of groups to which the user data may be open, whether the user data may be open to all groups, and the like.

On the other hand, the user data managing part 340 judges that the user data having the security setting that is the predetermined security level or higher as the user data having access restriction, and stores the user data having access restriction in the user data management database 341.

The user data management database 341 retains the user data having access restriction.

The network interface part 350 provides an interface between the network 200 and each of the address managing part 310, the security managing part 320, the user managing part 330, and the user data managing part 340 described above.

<Process Flow of User Registration>

Figure 11:
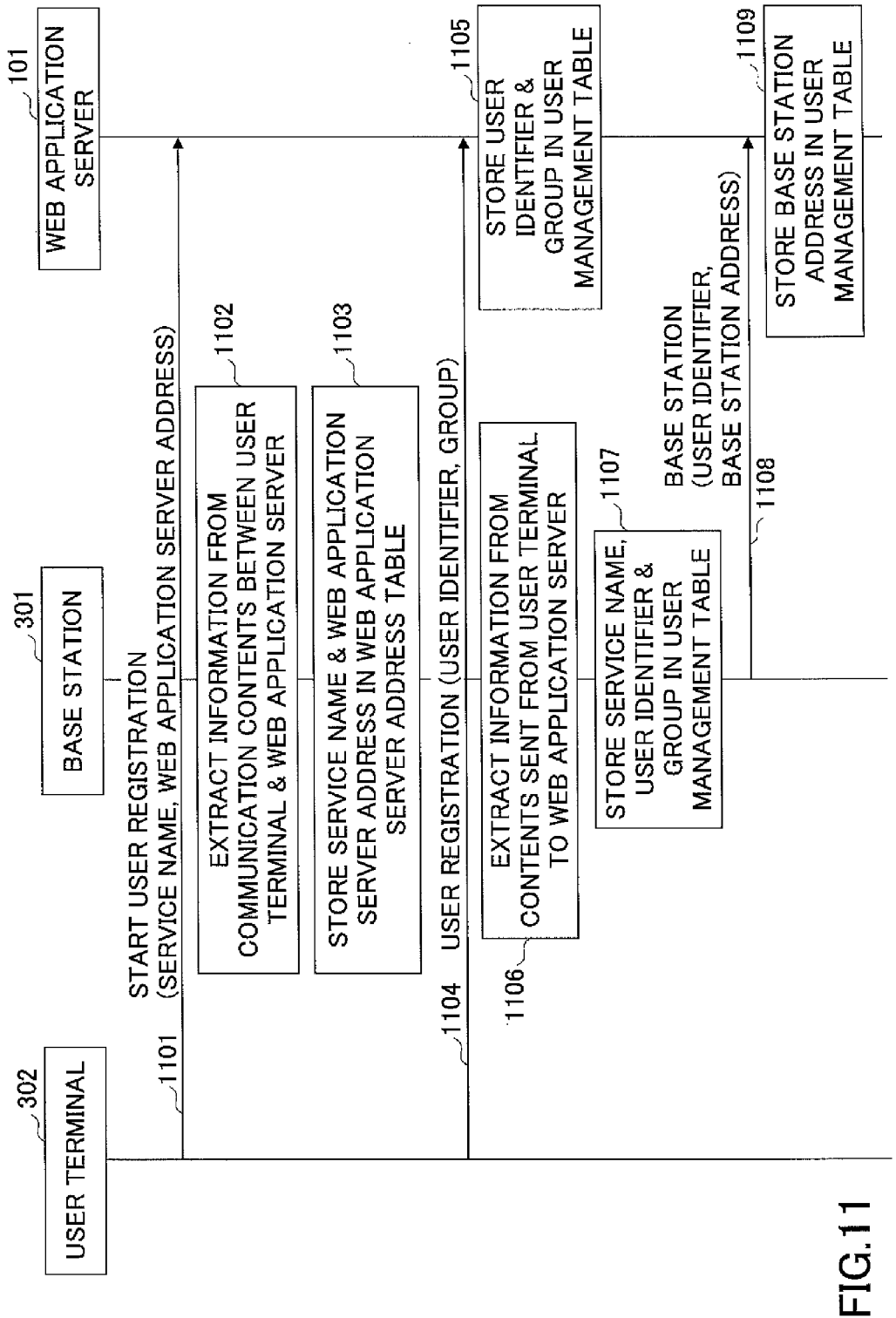
FIG. 11 is a flow chart illustrating a user registration process of the embodiment to register the user to the Web application service.

A description will be given of a user registration process of the embodiment to register the user to the Web application service, by referring to FIG. 11. By the user registration process of the flow chart, the base station 301 creates the Web application server address table 820 (FIG. 8) and the user management table 1000 (FIG. 10). In addition, the Web application server 101 creates the user management table 600 (FIG. 6).

In a step 1101, the user terminal 302 starts the user registration to the Web application server 01. An interface for making the user registration may be provided by the application processing part 131 of the Web application server 101.

The user terminal 302 sends the service name of the Web application service and the address of the Web application server providing this service, in order to start the user registration. Information input from the user terminal 302 by the user 303 is stored in the user management database 111 via the user registering part 112.

The base station 301 relays and monitors the communication between the user terminal 302 and the Web application server 101 (or a DNS (Domain Name Server), not illustrated).

In a step 1102, the user managing part 330 of the base station 301 extracts the service name and the address of the Web application server from the communication made in the step 1101. The address is the URL of the Web application server extracted from the communication between the user terminal 302 and the DNS or, the IP address extracted from the communication between the user terminal 302 and the Web application server 101.

In a step 1103, the address managing part 310 of the base station 301 stores in the address management database 311 the service name and the address of the Web application server 101 extracted in the step 1102. Hence, the base station 301 creates the Web application server address management table 820 illustrated in FIG. 8.

In a step 1104, the user terminal 302 sends the user identifier of the user 303, and the group to which the user 303 belongs, to the Web application server 101 in order to make the user registration.

In a step 1105, the user managing part 112 of the Web application server 101 stores in the user management database 111 the received user identifier and group that are sent in the step 1104. Thus, the user managing part 112 creates the columns of the user identifier 601 and the group 602 in the user management table 600 illustrated in FIG. 6.

In a step 1106, the user managing part 330 of the base station 301 extracts the user identifier and the group from the communication made in the step 1104.

In a step 1107, the user managing part 330 of the base station 301 stores in the user management database 331 the user identifier and the group extracted in the step 1106. Hence, the base station 301 creates the user management table 1000 illustrated in FIG. 10.

In a step 1108, the user managing part 330 of the base station 301 sends to the Web application server 101 the user identifier extracted in the step 1106 and the address of the base station 301 preset in the base station 301.

In a step 1109, the user registering part 112 of the Web application server 101 stores in the user management database 111 the received user identifier and address of the base station 301 sent in the step 1108. Thus, the user managing part 112 creates the column of the base station address 603 in the user management table 600 illustrated in FIG. 6. As a result, the base station 301 is registered to the Web application server 101.

By performing the steps 1101 through 1109 described above between the user terminal 302 and the Web application server 101 every time the user registration is started, information is added to each of the tables illustrated in FIGS. 6, 8, and 10. In addition, when a deletion is made with respect to the user registration, information related to the user whose registration is to be deleted may be deleted from each of the tables illustrated in FIGS. 6, 8, and 10.

<Process Flow of Security Setting>

Figure 12:
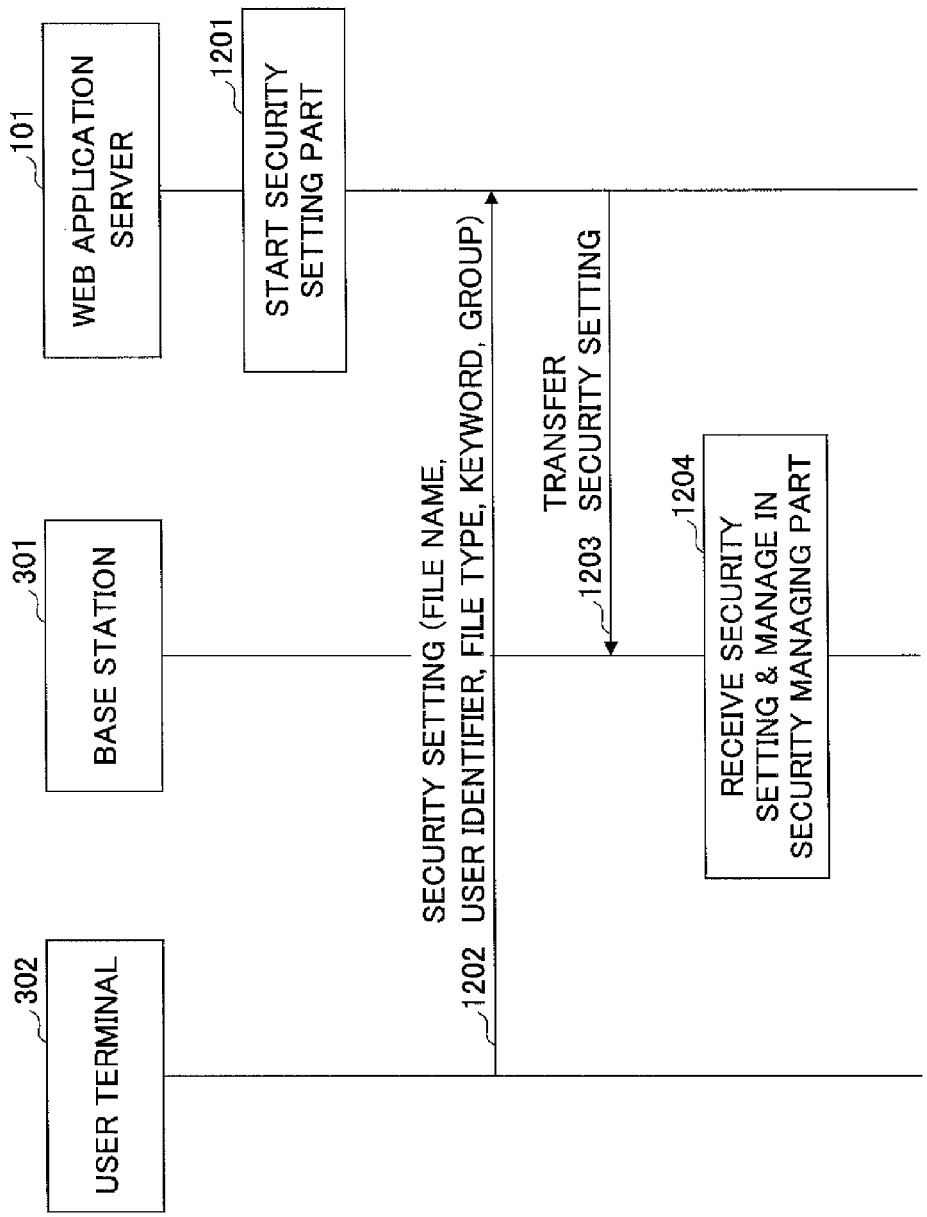
FIG. 12 is a flow chart illustrating a security setting process of the embodiment.

A description will be given of a security setting process of the embodiment, by referring to FIG. 12. By the security setting process of the flow chart, the base station 301 creates the security management table 900 (FIG. 9).

In a step 1201, the security setting part 132 of the Web application server 101 starts, and urges the user 303 to input the security setting fro the user terminal 302.

In a step 1203, the user terminal 302 sends to the Web application server 101 the file name, the keyword, and the group permitted to make access to the file, that are input for each file by the user 303. The user terminal 302 also sends the user identifier of the user 303 who is the owner of the file, and the file type of the file.

In a step 1203, the security setting part 132 of the Web application server 101 transfers to the base station 301 the received security setting sent from the user terminal 302 in the step 1202.

In a step 1204, the security managing part 320 of the base station 301 stores in the security management database 321 the received security setting transferred in the step 1203. Hence, the base station 301 creates the security management table 900 illustrated in FIG. 9.

<Process Flow of User Data Transmission And Reception>

Figure 13:
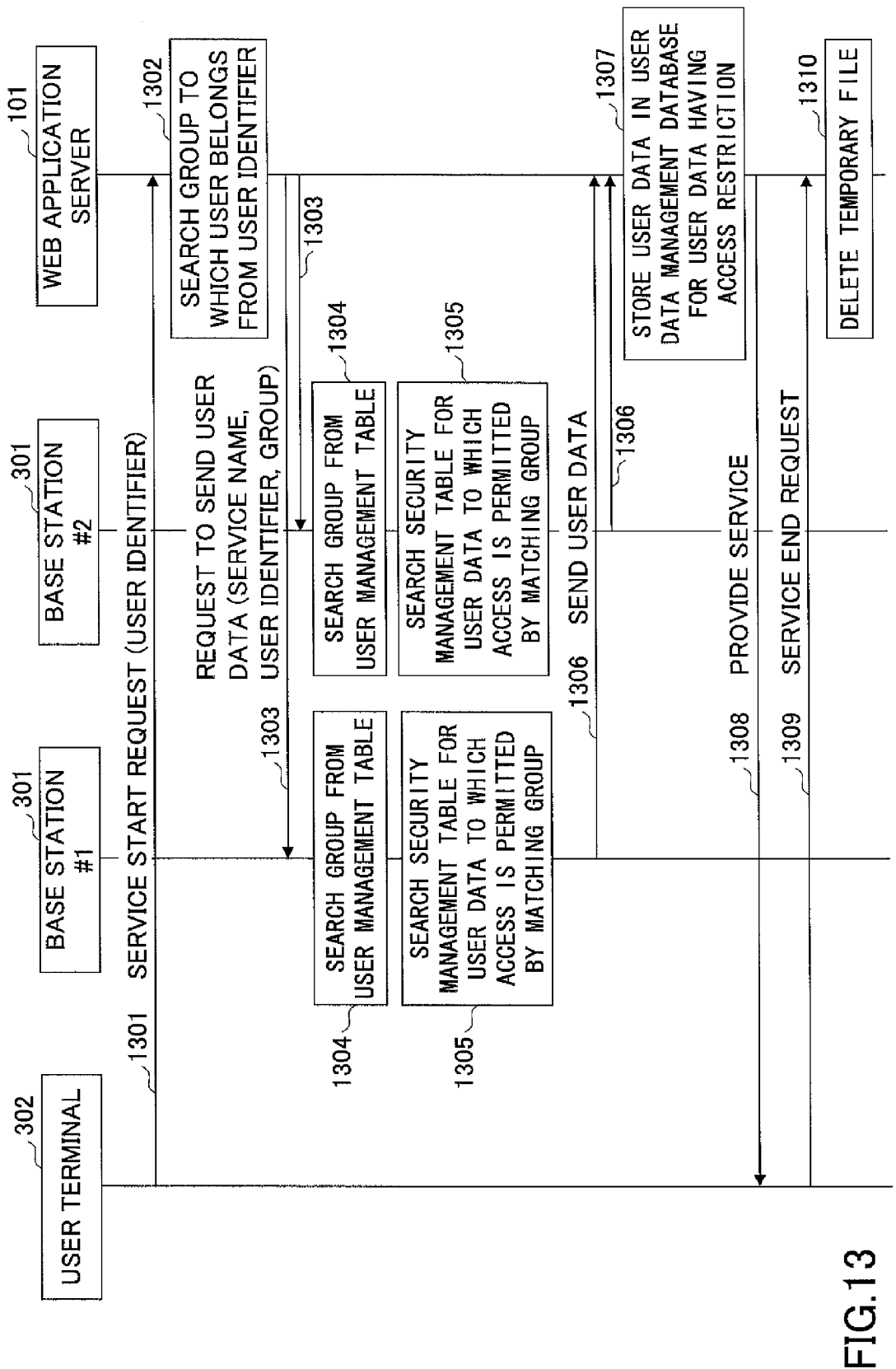
FIG. 13 is a flow chart illustrating a user data transmission and reception process of the embodiment.

A description will be given of a user data transmission and reception process of the embodiment, by referring to FIG. 13. In the example illustrated in FIG. 13, two base stations 301 (#1 and #2) contribute to the user data transmission and reception process of the flow chart.

In a step 1301, the user terminal 302 sends a service start request for the Web application service to the Web application server 101. The service start requests includes the user identifier.

In a step 1302, the user data acquiring part 124 of the Web application server 101 uses the user management table 600 in order to search for the group 602 to which the user 303 having the received user identifier sent in the step 1301. In addition, the user data acquiring part 124 searches the user management table 600 for the base station address of the base station 301 accommodating the user 303.

In a step 1303, the user data acquiring part 124 sends the request to send the user data including the service name, the user identifier, and the searched group indicating the group to which the user data are open, with respect to the base station address searched in the step 1302.

In a step 1304, the user managing part 330 of the base station 301 searches the user management table 1000 for the group corresponding to the received service name and user identifier sent in the step 1303. The user managing part 330 judges whether the received group sent in the step 1303 and to which the user data may be open is included in the group searched by the user managing part 330 itself. The process advances to a step 1305 when the received group sent in the step 1303 and to which the user data may be open is included in the group searched by the user managing part 330 itself. The sending of the user data is refused when the received group sent in the step 1303 and to which the user data may be open is not included in the group searched by the user managing part 330 itself.

In a step 1305, the security managing part 320 of the base station 301 searches the security management table 900 for the file to which the access is permitted for the group searched in the step 1304.

In a step 1306, the user data managing part 240 of the base station 301 reads the file search in the step 1305 from the user data management database 341, and sends the read file to the Web application server 101.

The steps 1303 through 1306 are performed by all of the base stations 301 whose address is searched by the Web application server 101 in the step 1302. In the example illustrated in FIG. 13, it is found that the base station 301 (#1) retains the user data that may be accessed by the groups 1 and 2, and the base station 301 (#2) stores the user data that may be accessed by the group 3, and thus, the Web application server 101 sends the request to send the user data to the base stations 301 (#1 and #2) so that each of the base stations 301 (#1 and #2) performs the process described above.

In a step 1308, the Web application server 101 sends to the user terminal 302 the acquired user data sent in the step 1306, in order to provide the service.

In a step 1309, the user terminal 302 sends a service end request.

In a step 1310, the Web application server 101 that receives the service end request deletes the user data acquired in the step 1306 from the user data management database 121 for the user data having access restriction. The user data may be deleted at a timing when the predetermined time elapses from the time when the service ended, as described above in conjunction with FIG. 4.

<Process Flow of User Data Updating in Base Station>

A description will be given of a user data updating process of the base station of the embodiment, by referring to FIG. 14.

In a step 1401, when the user 303 utilizing the Web application service updates the user data retained in the Web application server 101, one of the following two processes is performed depending on whether the updated user data have access restriction or no access restriction. A step 1402 is performed when the updated user data have no access restriction, and a step 1403 is performed when the updated user data have access restriction.

In the step 1402, because the user data having no access restriction are constantly retained in the Web application server 101, the user data acquiring part 124 updates the user data having no access restriction and stored in the user data management database 123.

In the step 1403, because the user data having access restriction and open only within the specific group are originally retained in each base station 301, a user data update request is made with respect to the base station 301 that manages the original user data.

In a step 1404, the base station 301 that receives the user data update request updates the user data having access restriction and stored in the user data management database 341.

<Process Flow of Base Station Address Updating>

A description will be given of a base station address updating process of the embodiment, by referring to FIG. 15.

Each base station 301 manages its own base station address in the base station address management table 810. When the user 303 moves or newly provides the base station 301, the base station address may change. In order to automatically reflect such a change in the base station address, the base station address updating process of the flow chart illustrated in FIG. 15 is performed.

In a step 1501, a change occurs in the base station address of the base station 301.

In a step 1502, the address managing part 310 of the base station 301 sends to the Web application server 101 an address change notification including the base station address after the change, the base station address before the change, and the user identifier of the user 303 accommodated by the base station 301.

In a step 1503, the user registering part 112 of the Web application server 101 specifies the base station 301 from the received base station address before the change, sent in the step 1502, using the user management table 600. The user registering part 112 updates the base station address of the specified base station 301 by the received base station address after the change, sent in the step 1502.

In a step 1504, the updating is completed.

According to the embodiment, the base station may manage information and/or security of information related to a Web application service, and the performance and security of the entire system may be improved.

Many other variations and modifications will be apparent to those skilled in the art.

All examples and conditional language recited herein are intended for pedagogical purposes to aid the reader in understanding the invention and the concepts contribute by the inventor to furthering the art, and are to be construed as being without limitation to such specifically recited examples and conditions, nor does the organization of such examples in the specification related to a showing of the superiority and inferiority of the invention. Although the embodiments of the present invention have been described in detail, it should be understood that the various changes, substitutions, and alterations could be made hereto without departing from the spirit and scope of the invention.

The invention claimed is:

1. A base station accommodating a user terminal and communicable with a Web application server, comprising:
a database configured to store user data; and
a processor, wherein the processor includes
  a security managing unit configured to manage user groups to which the user data are open; and
  a user data managing unit configured to manage the user data,
wherein, when the user data managing unit receives a request to send user data from the Web application server, and a user group included in the request and to which the requested user data are open is included within the user groups managed by the security managing unit, the user data managing unit sends the requested user data to the Web application server, and
wherein the user data managing unit stores user data open only to predetermined user groups in the database, and sends user data open to all user groups to the Web application server.

2. The base station according to claim 1, wherein the processor further includes:
  a user managing unit configured to extract an identifier of a user and a user group to which the user belongs from a communication between the user terminal and the Web application server; and
  an address managing unit configured to retain an address of the base station,
  wherein the user data managing unit sends the identifier and the user group extracted by the user managing unit to the Web application server together with the address retained by the address managing unit.

3. The base station according to claim 1, wherein the user groups to which the user data are open are set for each file of the user data.

4. The base station according to claim 1, wherein the user groups to which the user data are open are set for each combination of an identifier of a user and a type of the user data.

5. A method of operating a base station accommodating a user terminal, communicable with a Web application server, and including a database configured to store user data processor configured to perform a process comprising:
  first managing user groups to which the user data are open;
  second managing the user data;
  when the second managing receives a request to send user data from the Web application server, and a user group included in the request and to which the requested user data are open is included within the user groups managed by the first managing, sending the requested user data to the Web application server by the second managing,
  wherein the second managing stores user data open only to predetermined user groups in the database, and sends user data open to all user groups to the Web application server.

6. The method as claimed in claim 5, wherein the user groups to which the user data are open are set for each combination of an identifier of a user and a type of the user data.

7. A Web application server providing a service to a user terminal via a base station the Web application server comprising:
  a processor,
  wherein the processor includes
    a user managing unit configured to manage an identifier of a user, a user group to which the user belongs, and base stations;
    a security setting unit configured to set a user group to which user data are open and send the set user group to the base stations;
    a group judging unit configured to judge one of the base stations including the user data; and
    a user data managing unit configured to retain the user data only for a predetermined time,
  wherein the group judging unit judges, based on the identifier of the user included in an access request from the user terminal, a base station accommodating a user belonging to a user group identical to the user group to which the user identified by the identifier belongs, from the user managing unit,
  wherein the user data managing unit acquires user data by sending a request for the user data to the base station judged by the group judging unit, and
  wherein the user data managing unit stores user data open to all user groups, and sends user data open only to predetermined user groups to the base station.

8. The Web application server as claimed in claim 7, wherein the user groups to which the user data are open are set for each combination of the identifier of the user and a type of the user data.

9. A system to provide a Web application service, comprising:
  a base station including a database configured to store user data, and a first processor,
  wherein the first processor includes a security managing unit configured to manage user groups to which the user data are open, and a first user data managing unit configured to manage the user data; and
  a Web application server communicable with the base station and including a second processor,
  wherein the second processor includes
    a user managing unit configured to manage an identifier of a user, a user group to which the user belongs, and base stations,
    a security setting unit configured to set a user group to which user data are open and send the set user group to the base stations,
    a group judging unit configured to judge one of the base stations including the user data, and
    a second user data managing unit configured to retain the user data only for a predetermined time,
  wherein, when the first user data managing unit receives a request to send user data from the Web application server, and a user group included in the request and to which the requested user data are open is included within the user groups managed by the security managing unit, sending the requested user data to the Web application server from the first user data managing unit
  wherein the first user data managing unit stores user data open only to predetermined user groups in the user data management database, and
  wherein the second user data managing unit stores user data open to all user groups.

10. The system as claimed in claim 9, wherein the user groups to which the user data are open are set for each combination of the identifier of the user and a type of the user data.

* * * * *